United States Patent [19]

Chirovsky

[11] Patent Number: 5,198,656

[45] Date of Patent: Mar. 30, 1993

[54] DYNAMIC OPTICAL LOGIC USING VOLTAGE PULL UP

[75] Inventor: Leo M. F. Chirovsky, Bridgewater, N.J.

[73] Assignee: AT&T Bell Laboratories, Murray Hill, N.J.

[21] Appl. No.: 711,682

[22] Filed: Jun. 6, 1991

[51] Int. Cl.[5] .............................. H01J 31/50
[52] U.S. Cl. .............................. 250/214 LS; 359/128
[58] Field of Search ........... 250/213 A, 211 J, 211 R, 250/551; 357/19, 30; 359/126-128; 307/311; 377/102

[56] References Cited

U.S. PATENT DOCUMENTS

| 4,751,378 | 6/1988 | Hinton et al. | 250/211 J |
| 4,904,858 | 9/1990 | Le Marche | 250/213 A |
| 4,967,068 | 10/1990 | Lentine et al. | 250/213 A |
| 5,093,565 | 3/1992 | Lentine | 250/213 A |

Primary Examiner—David C. Nelms
Assistant Examiner—S. Allen
Attorney, Agent, or Firm—Richard D. Laumann

[57] ABSTRACT

An optical switch in which states are defined by dynamic charge storage, rather than contention resolution, and which switches using pulsed radiation having a wavelength somewhat longer than the exciton wavelength in a SEED diode. The switch does not exhibit or need bistability but switches at a relatively low energy as compared to S-SEEDS switched at the exciton wavelength.

25 Claims, 3 Drawing Sheets

DYNAMIC OPTICAL LOGIC USING VOLTAGE PULL UP

TECHNICAL FIELD

This invention relates to logic devices that have their states switched and read by optical pulses and to methods used to switch and read such devices.

BACKGROUND OF THE INVENTION

At the present time, electrical logic devices, i.e., logic devices whose states are switched electrically, are pervasively used in applications such as computers, telecommunications switches, etc. However, much effort has been directed toward the development of optical logic devices, i.e., devices whose states are switched and read optically, in the hope that such devices could utilize the high spatial bandwidth of free space optics to connect large two dimensional arrays of optical logic devices. Such a configuration would make applications such as, e.g., parallel processing relatively straightforward and more easily implemented than with electrical logic devices.

Practical implementation of such devices requires that the arrays satisfy several conditions. The devices should, of course, have optical inputs and outputs, and it should be possible to toggle between two states. It would be further desirable that the arrays could be configured so that the outputs of one array could be used directly as inputs for another array. This configuration would permit the arrays to be optically cascadable.

Those skilled in the art have directed much effort toward the fabrication of such devices and arrays. For example, a p-i (MQW) -n structure exhibiting the quantum confined Stark effect (QCSE) has been developed. MQW is an acronym for multiple quantum well. This structure will be referred to as a SEED diode. A SEED diode connected in series with another element acting as a load forms a SEED which is an acronym for self-electro optic effect device. If the load is another reverse biased SEED diode, a symmetric SEED (S-SEED) is formed. The S-SEEDs can be easily fabricated in arrays. The reflectivity and the responsivity are functions of both the optical wavelength and the applied voltage due to the quantum confined Stark effect. These devices are now well known to those skilled in the art and need not be described in detail. See, for example, IEEE Journal of Quantum Electronics, QE-25, pp. 1928-1936, 1989 and IEEE Journal of Quantum Electronics, QE-21, pp. 1462-1476, 1985 for detailed descriptions of the device.

The operation of the device is important to an understanding of the invention and will be briefly described. S-SEEDs have typically been operated in a dual rail geometry at $\lambda_0$, the exciton wavelength, where there is a positive feedback which leads to a bistable or latching device. The functionality of the device is a set-reset latch which performs simple Boolean logic functions with differential optical input signals. The device is first set to a known state and input beams applied. If the beams have sufficiently different intensities, the state of the device switches. Reading of the states is done by two high-intensity equal bias beams which yield differential output intensities for the two states.

While perfectly adequate for many applications, the switching energies and switching times of the operating mode of the S-SEED described are relatively high and long, respectively, for some applications. Lower switching energies and shorter switching times would be desirable. It would also be desirable to have an operating mode which automatically resets the device in each cycle.

Of course, other optical switches have been developed. See, e.g., U.S. Pat. No. 4,985,621 issued on Jan. 15, 1991 to Aull et. al. The switch described used a series connected photodiode and resonant tunneling diode to generate a control signal. The control signal was then amplified and the amplified signal applied to the modulator. The switch sacrifices some attributes of the S-SEED switch that are most useful in many applications.

SUMMARY OF THE INVENTION

An optical switch uses a series connected pull-down device, with signal means for triggering the device, and a voltage controlled optical modulator. Optical clock means illuminates the modulator such that optical output from the modulator indicates the state of the switch. Also included is sensor means for receiving the optical output. In one embodiment, the modulator is a reversed biased SEED diode, and the switch utilizes the dynamic properties and the non-linear optical properties of the reverse biased SEED diode modulator. The reflectivity or transmissivity of the modulator exhibits a threshold behavior as a function of a stored charge. In the dynamic mode of operation of this invention, the states are defined by charge storage, and voltage pull-up and pull-down occur at different times. The diode modulator performs pull-up and provides the optical output. The signal means, which may be optical, triggers the pull-down device, and the clock means illuminates the SEED diode modulator. The clock and signal means are applied at staggered times. The amount of clock light reflected from or transmitted through the modulator is received by the sensor means and indicates the state of the switch. The reflected or transmitted light may be read directly by a photodetector or it may be the signal means for another switch. The diode modulator thus provides the optical output. The clock means produces pulses which can have a relatively short duration so that the optical output occurs before the pull-up action induced by the clock action occurs. The pulses have a repetition time greater than twice the time for photo-excited carriers to equilibrate but less than the time required for the dark leakage current to change the final state of the device.

In a preferred embodiment, the pull-down device comprises a photodiode which may be another SEED diode. In a still further preferred embodiment, the signal and clock means illuminate the SEED diodes at a wavelength longer than the exciton wavelength. In yet another embodiment, the switches are fabricated in an array, and the output of one array is used as the input for another array. Another embodiment of the invention is a method for operating the switch.

Yet another embodiment of the invention is a switch with input and output sections. The output section comprises a SEED diode modulator, clock means for illuminating the diode, and a series connected field-effect transistor (FET) for electrical pull-down. With a properly chosen gate-source threshold voltage, the FET provides a sharp switching threshold and voltage gain. The FET is triggered by an electrical signal to its gate from an input section which converts an optical signal to an electrical signal. The input section comprises a series connected photodiode and load with the gate connected to the common node of the photodiode and load.

DETAILED DESCRIPTION

The invention will be first described by reference to a particular embodiment. Variations of this embodiment and still other embodiments will be described and apparent to those skilled in the art.

Figure 1:
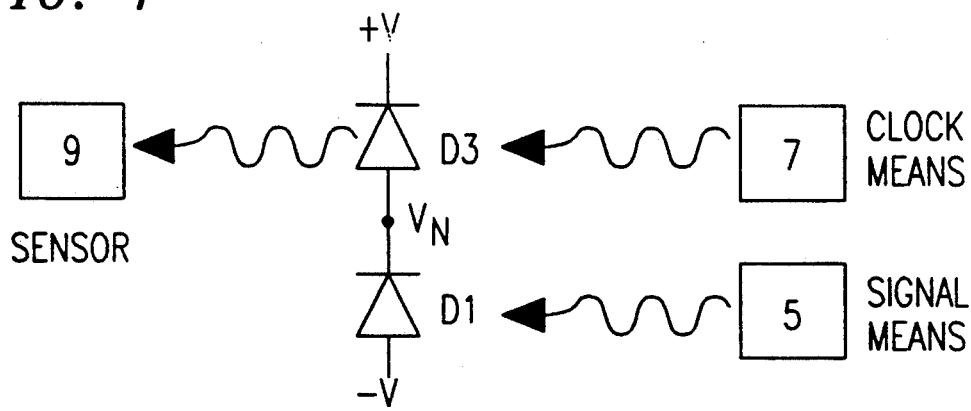
FIG. 1 is a schematic representation of one embodiment of an optical switch according to this invention.

Symmetric SEEDs are now well known to those skilled in the art and need not be described in detail. The devices have two reverse biased, series connected p-i(MQW)-n diodes (SEED diodes) grown on a mirror. A schematic diagram of an embodiment of an optical switch according to this invention is shown in FIG. 1. Depicted are SEED diodes D1 and D3 which are connected in series as shown between two fixed voltages which need not be equal in absolute value. The i region is a multiple quantum well region. This is similar to the conventional S-SEED except that the diodes can be smaller than in an S-SEED because only a single optical window in required. Also depicted are signal means 5 for illuminating diode D1 and clock means 7 for illuminating diode D3. Signal and clock means 5 and 7 generate signal and clock pulses, respectively. The optical output from diode D3 is also indicated and is received by sensor 9. The optical output may be either the reflected or transmitted portion of the clock pulses; the former is typically preferred. Sensor 9 may be a photodetector or it may be diode D1 of another switch. Diodes D1 and D3 are pull-down and modulator devices, respectively. Signal means 5 forms means for optically triggering the device. The clock and signal means are incident on the elements of the switch at different times. The modulator also performs the pull-up functions.

The structure represented will be fabricated by those skilled in the art without any detailed explanation. SEED diodes are easily fabricated with compound semiconductors, such as Group III-V semiconductors, and well-known growth, etching, metallization, etc., techniques. The light sources for the clock and signal means will also be easily fabricated, as will appropriate timing techniques for the means after consideration of the following. For example, a mode-locked laser can be used as the light source. Such a laser readily emits short light pulses.

Figure 2:
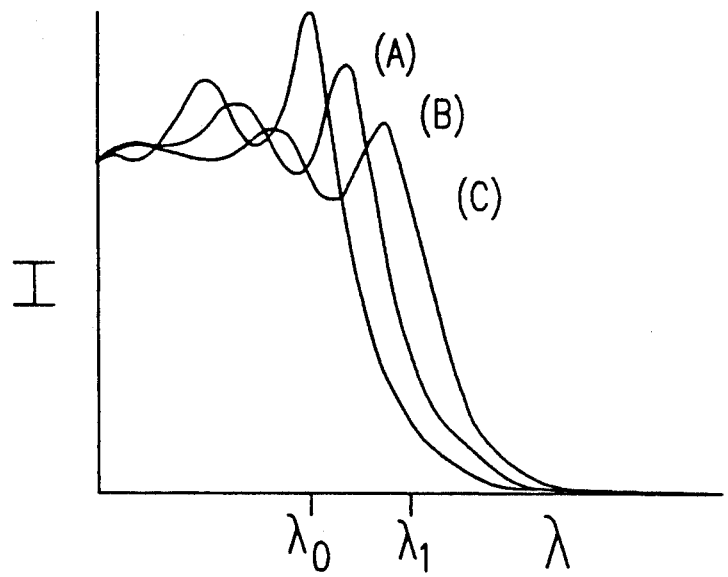
FIG. 2 plots the photocurrent vertically in arbitrary units versus the wavelength horizontally in arbitrary units for an exemplary SEED diode at several reverse biases.

Both the reflectivity, R, and the responsivity, S, of a SEED diode are functions of both the optical wavelength, $\lambda$, and the applied voltage, V. As is well known, the variations are due to the quantum confined stark effect. FIG. 2 plots the photocurrent vertically versus the wavelength horizontally for an exemplary SEED diode at several applied reverse voltages. The bias voltage increases from curve (a) to (b) and from curve (b) to (c). The exciton peak is at $\lambda_0$, i.e., the peak value of the photocurrent, and voltage changes cause the peak to shift. S-SEEDs have been operated at $\lambda_0$ where the structure of the I versus V curve produces positive feedback leading to optical bistability; however, the dynamic logic switch is not predicated upon optical bistability and does not need bistability. The preferred wavelength of operation for the dynamic optical logic switch is shown as $\lambda_1$ on curve (a). Similar points will be readily selected for other bias voltages.

Figure 3:
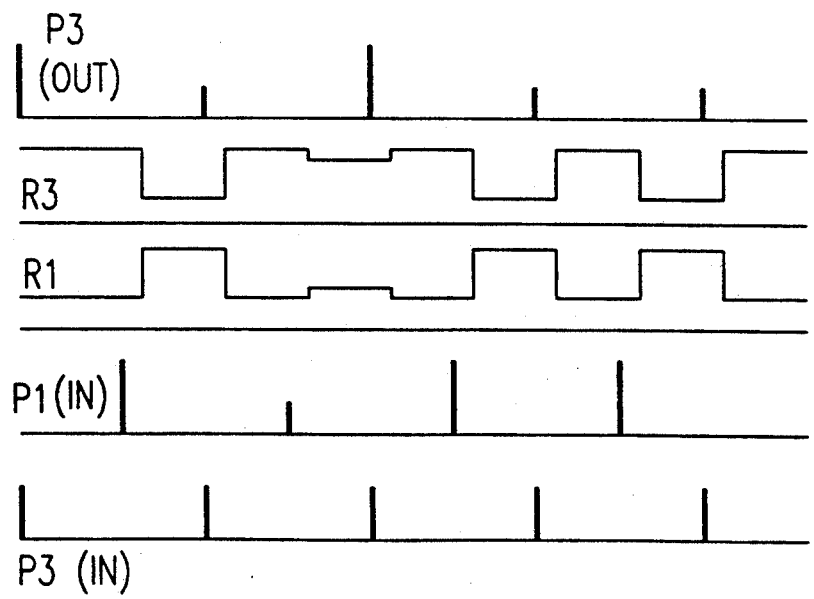
FIG. 3 illustrates the timing sequence for the input signal and clock pulses.

The switch is advantageously operated in a dynamic mode, and is so operated in a preferred embodiment of this invention, at wavelengths longer than the exciton wavelength, although there is no optical bistability at these wavelengths. In a dynamic mode, the states are defined by charge storage, and pull-up and pull-down occur at different times. This method of operation contrasts with what can be called contention resolution in which there are two devices: one trying to pull down and one trying to pull up at the same time, and the state is defined by the stronger device. A high signal beam charges the device and a low signal fails to charge the device. Once the signals stop and the photocarriers equilibrate, the state of the device does not change for a long time, i.e., the charge leakage time. The repetition time between signals and clock pulses must be less than the leakage time. A clock pulse on the modulator, as previously mentioned, if short enough, reads the state before the photoexcited carriers equilibrate. Once they equilibrate, they discharge or pull up, the device or reset to the same state regardless of the state set by the previous signal. The dynamic mode of operation will be better understood after consideration of FIG. 3 which shows the timing sequence for pulses P1 and P3 which are incident on diodes D1 and D3, respectively. The time scale is in arbitrary units. The reflectivities are also shown. P1 and P3 are the signal and clock pulses, respectively. Their arrival times are interleaved as shown. The time scale shown is in arbitrary units. P1 is a stream of pulses which have either a high or low value, which may be determined by a previous switch or stage if the switches are cascaded. P3 is a series of constant amplitude pulses which read the switch, since the intensity of the optical output indicates the state of the switch, and also reset R3 which is the reflectivity of diode D3. The output of the switch is the reflected pulse, i.e., P3 (out), and is either high or low depending upon the device state as set by a P1 pulse.

When the constant amplitude P3 pulses are applied, the state of the switch does not change until the photoexcited charges equilibrate. Once they do, the diode D3, i.e., the modulator, is discharged. The entire voltage drop then appears on diode D1 and causes the diode D1 absorption to be high and the diode D3 reflectivity to be high. P3 (in) has thus reset the device and it remains in this reset state until the next strong P1 pulse arrives. It is beneficial for greater signal conversion efficiency that diode D1 be in its maximum absorption state when signal pulses arrive.

Figure 4:
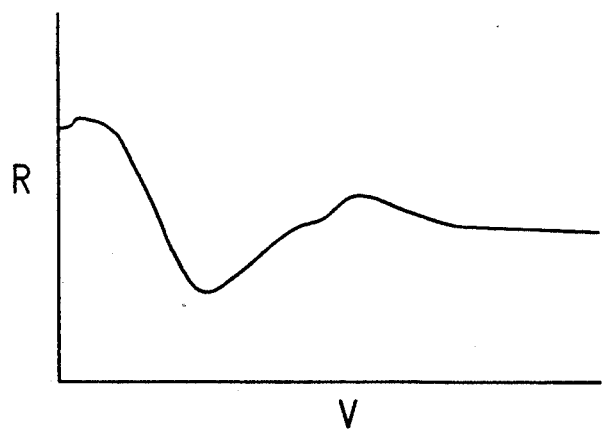
FIG. 4 plots the reflectivity vertically at $\lambda_1$ in arbitrary units versus the reverse bias in arbitrary units for an exemplary SEED diode.

If the next P1 (in) pulse is sufficiently strong, diode D1 is completely discharged and diode D3 is completely charged so that its reflectivity becomes small and the following P3 (out) will be low. The state of the switch has thus been switched. However, if P1 (in) is weak, then diode D3 will be only slightly charged, and its reflectivity stays high when it is read by the next clock pulse P3 (in). This is due to the nonlinear sigmoid like dependence of a SEED diode's reflectivity on its degree of charging as shown in FIG. 4. The reflectivity is plotted vertically and the reverse bias is plotted horizontally, and both axes are in arbitrary units. The slight charging of diode D3 by a weak P1(in) will also be discharged by a clock P3(in) pulse. It will be appreciated that the clock pulse performs two functions: (1) to be reflected and indicate the state of the device, and (2) to be absorbed and reset the diode always to the same state.

It should be noted that, as described so far, the device operates as a simple inverter. But if two independent orthogonally polarized signals can be incident simultaneously into the single optical window of diode D1, the device becomes a logic gate, i.e., a NOR gate. For such operation, the signal means will produce first and second orthogonally polarized beams.

Figure 5:
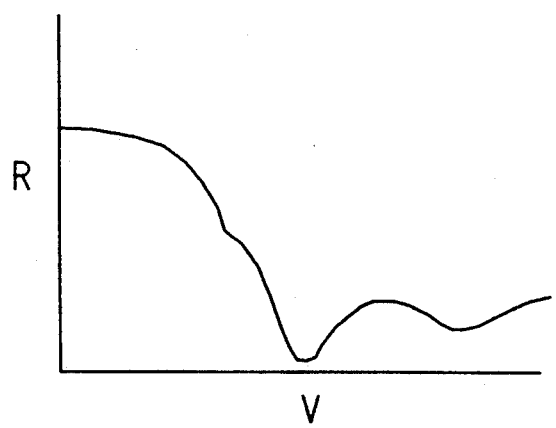
FIG. 5 plots the reflectivity at $\lambda_1$, in arbitrary units versus the reverse bias, in arbitrary units for an exemplary asymmetric Fabry-Perot SEED Diode.

High signals must completely charge diode D3 while low signals may charge diode D3 to a limited extent but not enough to start changing the reflectivity. This imposes a requirement on the input contrast ratio $C_i = P(1-)_{Hi}/P(1)_{lo}$ which depends on the shape of the R versus V (or Q, the charge) curve of the SEED diode. For cascadability, the output contrast ratio, $C_o = R_{Hi}/R_{lo}$ must exceed $C_i$. The subscripts Hi and lo refer to the high and low reflectivity states, respectively. Those skilled in the art are well aware that when high output contrast ratios are required, they may be obtained from the SEED diode when it is configured as an asymmetric Fabry-Perot resonator (AFP) using only the front surface reflectivity. FIG. 5 plots the reflectivity vertically in arbitrary units versus the voltage horizontally in arbitrary units for an AFP SEED diode at $\lambda_1$.

For cascadability, there must also be optical gain G, i.e., the energy in an output pulse from a device in stage n, U3(out), must be larger than the energy in an input pulse in the next stage n+1, U1(in), such that U3-(out)=G U1(in). The gain G must be larger than or equal to F/T, where F is the fanout and T is the transmission of the intervening optics between stages. Since a high output U3(out), $=R_{Hi}$ U3(in), must be greater than or equal to $GU_{sw}$ where $U_{sw}$ is the switching energy; one can define a factor $G^* = F/TR_{Hi}$, such that U3(in) is greater than or equal to $G^* U_{sw}$. The energy of the clock pulse U3(in) can be much larger than the switching energy because diode D3 can not be driven more than 1 volt into forward bias. U3(in) is, however, limited by saturation.

The switching energy required for dynamic switching can be approximately an order of magnitude smaller than that required to switch a typical prior art S-SEED. The switching time can be much shorter than that of a typical prior art S-SEED. The decreased energy and faster switching time may be qualitatively understood from consideration of the following. The switching time has two additive components; namely, the signal duration time and the charge equilibration time. The latter has been measured as less than 100 psec. See, for example, Applied Physics Letter, 57, pp. 1843-1845, Oct. 29, 1990. In a conventional S-SEED, the former term dominates and is severely limited by saturation. The former term is $G^* U_{sw}/P_{cl}$ where $P_{cl}$ is the clock power going into a previous stage. It can be shown by those skilled in the art that that term is equal to $(GCV/R_{Hi}SP_{cl})$, where C is the capacitance, V is the switching voltage swing, S is the average effective device responsivity, an $R_{Hi}$ is the high reflectivity. Useful readout can be obtained, even when the signal duration time is extremely short and the instantaneous $P_{cl}$ extremely high, provided their product equal to $GCV/R_{Hi}S$, does not exceed the saturation energy. The saturation energy at $\lambda_1$ is much higher than it is at $\lambda_0$. In the dynamic mode of operation, according to this invention, C and V are each decreased by a factor of approximately 2, while R and S are each increased by a factor of approximately 2. Essentially, the signal time can be made small compared to the charge equilibration time. As this term is small, the switching time is also small. Provided that saturation does not occur, the speed is then limited only by the pulse repetition rate or the charge equilibration time.

It will be appreciated that the optimum bias voltage will depend upon the wavelength used. Those skilled in the art will readily select an appropriate bias voltage for the wavelength selected.

Operation of dynamic logic depends upon the initial state not changing during a pulse and upon the repetition time being greater than twice the charge equilibration time (one for set and one for reset) but less than the time required for the dark leakage current to change the final state of the device. The optical power in the signal may be less than in the clock pulse, and a amplifier may be used between the means that receive the signal and clock pulses. This will be further explained in the discussion with respect to the embodiment of FIG. 6 and its variations.

Figure 6:
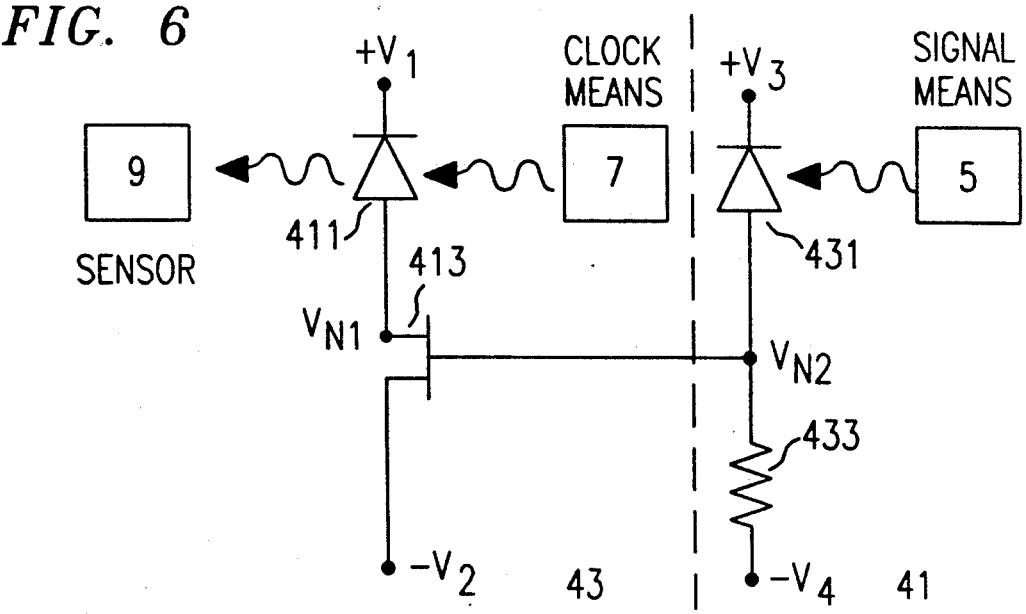
FIG. 6 is a schematic representation of another embodiment of an optical switch according to this invention.

Another embodiment of the invention is schematically depicted in FIG. 6. This embodiment will be harder to monolithically fabricate than will the embodiment described with respect to FIG. 1, but will have several performance advantages that will become evident from the following explanation. See U.S. Pat. No. 4,884,119, issued on Nov. 28, 1989, for a description of an integrated MQW optical and electronic structure. Depicted are input and output stages 41 and 43, respectively. The output stage has SEED diode 411 reverse biased in series between fixed voltages $+V_1$ and $-V_2$ with a field-effect transistor (FET) 413 with source, drain and gate electrodes, and has an optical clock means 7 for illuminating the SEED diode. The drain electrode of the FET is connected to SEED diode 411 at the node N1. The SEED diode 411 acts as a modulator for optical output and performs pull-up for resetting, while the FET performs as the pull-down component for switching, when its gate is electrically driven past a threshold voltage of node N2. Charge storage occurs at node N1, when node N2 is below threshold and the SEED diode 411 is not illuminated. The input stage comprises an optical signal means 5 and a reverse biased photodiode 431 connected in series through a load 433 between fixed voltages $+V_3$ and $-V_4$. The common node N2 of the photodiode 431 and the load 433 is connected to the FET gate. This input stage permits optical control of the FET by generating an electrical signal which controls the FET. The photodiode can, but does not need to be, a SEED diode. In the embodiment of FIG. 6, the load 433 is simply a resistor, although it can also be a SEED diode. Signals on the photodiode can enable the pull-down FET, and the resistor acts to disable the pull-down FET. Sensor means 9 receives the optical output from the modulator 411. Voltage controlled modulators other than a SEED diode may be used.

The embodiment of FIG. 6 is preferably operated dynamically as the embodiment in FIG. 1 to obtain the advantages of that embodiment and several advantages over that embodiment. However, the fixed voltages must be chosen correctly as consideration of the following shows. The voltage $-V_2$ on the FET source can be arbitrary, for example, ground(Gd). The voltage $+V_1$, applied to the modulator must then be chosen so that the node N1 voltage, $V_{N1}$, can swing over the range necessary for the SEED diode modulator. This range can be determined from a reflectivity versus bias voltage plot, such as those shown in FIG. 4 or FIG. 5. The voltage, $-V_4$ of the fixed node of the resistor, must be below the threshold voltage of the FET, making the FET normally-off. How far below threshold can be easily determined after consideration of factors such as the desired sensitivity to optical signals and available signal contrast between high and low signals. The voltage, $+V_3$, at the fixed node of the photodiode, must be above the threshold voltage, so that high optical signals can turn the FET on. How far above threshold can be chosen to optimize the responsivity of the photodiode.

The preferred dynamic method of operation of this embodiment also follows a timing sequence as depicted in FIG. 5. First, a clock pulse, whose duration is much shorter than charge equilibration time, arrives at the modulator and reads the state of the device, whether $V_{N1}$ is near $-V_2$, and the modulator is charged yielding a low reflected or transmitted output pulse, or whether $V_{N1}$ is near $+V_1$, and the modulator is discharged, yielding a high optical output pulse. Thereafter, since the FET is normally off, the photo-excited carriers begin to discharge the modulator to reset the modulator to a high-reflectivity state or are annihilated by forward bias currents if the modulator is already discharged. Then, after a time which can be arbitrarily short, a signal pulse (possibly from a previous device) arrives at the photodiode 431. If it is a weak or low signal, it will fail to raise $V_{N2}$ above threshold, leaving the FET off and allowing the modulator to complete discharging to the high reflectivity state. The next clock pulse arrives at the modulator a time after the signal which is longer than the charge equilibration time for the entire device, and yields a high optical output. Its photoexcited carriers again begin to discharge the modulator if any slight charging had occurred since the previous clock pulse. If the signal is strong or high, the photoexcited carriers will raise $V_{N2}$ above threshold, turning the FET on, to drain off the carriers generated by the previous clock pulse and to charge the modulator to its low reflectivity state. After a charge equilibration time, the resistor pulls $V_{N2}$ back down, turning the FET off, before the arrival of the next clock pulse, which will yield a low output and whose photoexcited carriers will begin to discharge or reset the modulator. The time between the clock pulses must, of course, be shorter then the node N1 leakage time.

The advantages of the embodiment in FIG. 6 over the embodiment shown in FIG. 1 are at least threefold. First, the signal pulse no longer needs to be delayed with respect to the previous clock pulse. This allows arbitrarily short distances between stages of cascaded devices. Second, there is sharper thresholding for switching provided by the FET which is reinforced by the modulator's own threshold for reflectivity change versus charging. The sharper thresholding gives better discrimination between high and low signals. Third, there is electrical gain provided by the FET since node N2 swings through a much smaller voltage range than does node N1. Thus, in this embodiment, although the signal pulse energy must have a value $U'_{sw}$ and the clock pulse an energy $G^{*'}U'_{sw}$ (greater than $U'_{sw}$), both energies can be much lower than the corresponding energies used in the embodiment of FIG. 1. This permits higher sensitivity, i.e., the same speed of operation with weaker optical power sources or higher speed with the same optical power sources.

The operation of the embodiment just described was that of a simple inverter. If two independent orthogonally polarized signals arrive at the single optical window of the input stage photodiode, the operation of the embodiment becomes that of a NOR gate. If operated at the wavelength, $\lambda_0$ (clock means), the embodiment becomes an OR-gate. Adjustments of the fixed voltages, $+V_3$ and $-V_4$ relative to the threshold voltage, can transform the NOR gate to a NAND gate and the OR gate to an AND gate. Thus, all the simple Boolean logic functions can be implemented with this embodiment.

Those skilled in the art will realize that the embodiment of FIG. 6 can be operated with a clock means and a signal means which give CW beams. Operation with CW beams, instead of with streams of pulses, has, however, several disadvantages. More power is consumed because currents are flowing continuously through all components. Signal distortions are passed on to the output. Thus, after several stages are cascaded, signal integrity may be compromised. Additionally, CW operation, does not permit either retiming of signals or synchronization. Both are absolutely necessary for systems comprised of many stages of large device arrays.

Yet another embodiment of the invention replaces the resistor in FIG. 6 with a photodiode and adds a means for optically illuminating it and thus disabling the pull-down FET of the output or switch stage. The photodiode may be a SEED diode, but this is not necessary. Operation of this embodiment is somewhat more complicated than that of the embodiment in FIG. 6, but has several additional advantages because charge storage can now also occur at node N2, and the strength of the disable component of the input stage can be externally varied by varying the intensity of the optical disable means.

In one mode of operation of this embodiment, the disable means can illuminate the FET disable photodiode with a CW beam. That photodiode then is a current source, and operation otherwise would be generally the same as for the embodiment previously described with respect to FIG. 6. There is one difference. The threshold for the amount of energy in a signal pulse needed to turn on the FET can be varied without changing the fixed voltage $-V_4$ with respect to the FET threshold voltage. Changing the intensity of the beam illuminating the disable photodiode can change the threshold. This means that sensitivity can be reduced if increased speed is desired. Additionally, a weak disable beam permits one to obtain a device state locked in the enabled state with modulator output always low whether signal inputs are high or low, or with a very strong disable beam a device locked in the disabled state with modulator output always high whether signal inputs are high or low.

In another mode of operation of this embodiment, the disable means can illuminate the FET disable photodiode with a stream of constant energy pulses. The timing sequence would be the same as that for the embodiment of FIG. 6, except that one disable pulse would be timed to arrive after each signal pulse, but before each clock pulse. The time intervals from signal to disable and from disable to clock can now be varied, as long as each interval is longer than a charge equilibration time and the total time between clock pulses is still shorter than node N1 leakage time. The net result is that charge storage can occur at node N2. After a charge equilibration time after the disable pulse, the FET is dynamically held in the off state, through the time of the arrival of a clock pulse on the modulator, until a signal pulse arrives at the signal photodiode. After a charge equilibration time after a signal pulse, the FET is dynamically held on for a high signal, or remains dynamically held off for a low signal until the arrival of the next disable pulse. It should be noted that the interval between the signal pulse and the disable pulse can be varied and that, during that time, no signal generated carriers are being drained off. Consequently, the signal switching energy of the device can be made lower than for any of the previously described embodiments.

Yet another mode of operation of this embodiment is possible, due to the possibility of charge storage at node N2, that was not possible for the previously-described embodiments. Since the FET can be held on or off dynamically, one can ignore the dynamic charge storage properties of the output stage and allow all pulses (clock, disable and signal) to be as long as, or even longer than, the charge equilibration times, thus eliminating the need for mode-locked laser sources. The timing sequence would have to be altered, however, from signal-disable-clock to disable-signal-clock. This mode of operation may be preferred if the required repetition time is still many times longer than charge equilibration time. The repetition time must, nevertheless, be shorter than node N2 leakage time. A slight detriment to this mode of operation is decreased output contrast, since the modulator must perform the pull-up for a high output, while it is illuminated by the clock pulse. This detriment may be offset by the fact that the output contrast may be higher due to a reduction of possible saturation effects.

Further reductions in the switching energies of the embodiments having input and output stages can be accomplished by adding electronic amplification stages between the input stage and the output stage. The amplification stage would drive node N2 (the gate of FET in the output stage) and the common node voltage swing of the input stage would then be amplified. In some embodiments, the input stage may have to be inverted so that the optical signal photodiode performs pull-down rather than pull-up.

Figure 7:
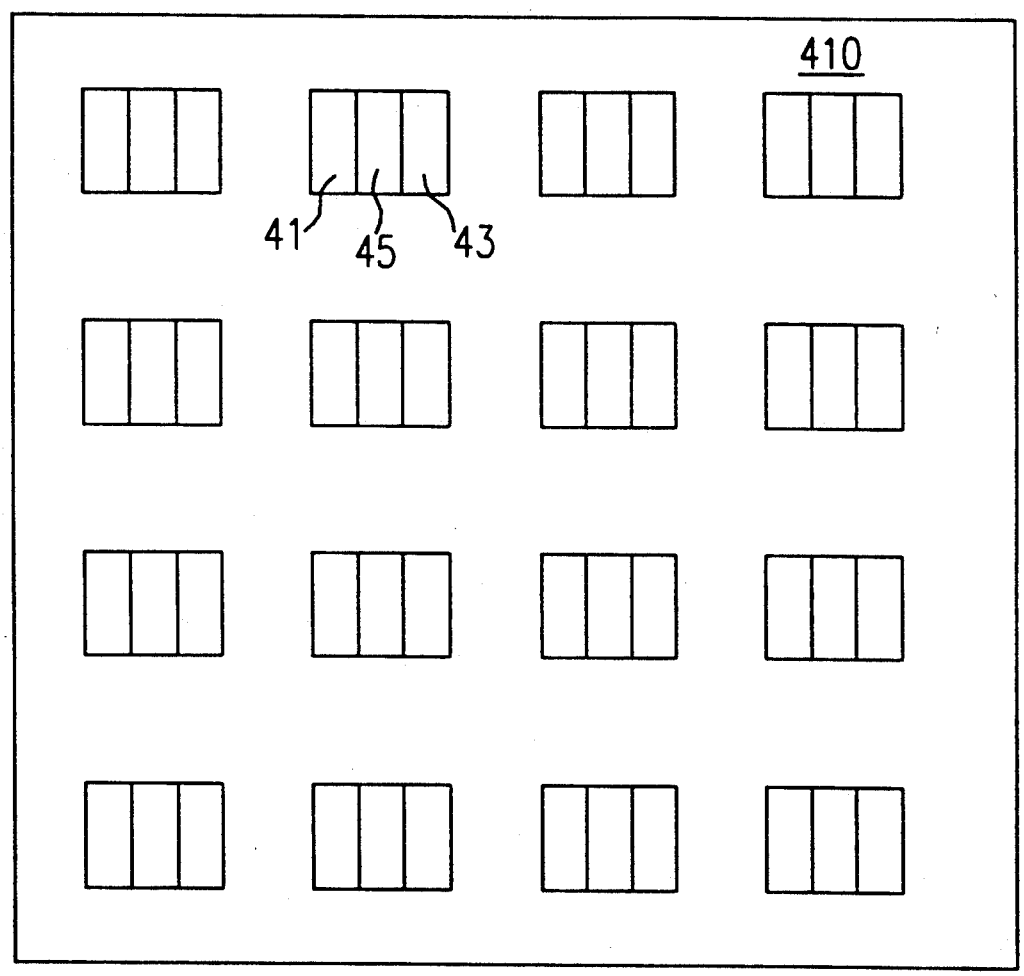
FIG. 7 is a schematic representation of an optoelectronic processing module according to this invention.

The above-described embodiments can act as simple logic gates and be fabricated into arrays of logic gates operating in parallel. Cascaded arrays can then be the basis of parallel digital data processing systems. More complex processing elements can also be made by combining optical and electronic logic gates, and then arrays of these elements can be fabricated and cascaded to make even more sophisticated parallel processing systems. The output stage of the embodiment of FIG. 6 and its variations can be driven directly by electronic logic gates. The input stage of those embodiments can directly drive electronic gates. This is schematically shown in FIG. 7 which shows an array 700 of individual optoelectronic processing modules 410. Each module comprises input stage 41, electronic processing means 45, and output sections 43. The processing means is connected to both the input and output sections. Those skilled in the art will readily implement such a module. Therefore, complex processing elements can be comprised of several of the above type optical input stages feeding several of the above type levels of electronic logic-feeding several optical output stages and can be operated dynamically as described above. The optics thus performs not only the interconnect function but also performs the necessary signal retiming and synchronization functions as well. The optical stages also contribute one level of logic.

In another embodiment, the optical switch has means for receiving an optical input signal pulse. The total energy in the pulse determines the signal level and the means generates stored charge in response to the pulse with the state of the switch being determined by the amount of stored charge and a nonlinear optical property. The switch further has means, connected to the means for receiving, for modulating a probe pulse. The probe pulse discharges the stored charge and thereby resets the switch. The probe pulse may have an energy greater than the energy of said signal pulse.

Variations of the embodiments described will be readily thought of by those skilled in the art. For example, the voltage controlled optical modulator may be a device that uses a change in refractive index with voltage and a self-gated or complementary field effect transistor for voltage pull-up. Additionally, the voltage controlled modulator may use effects other than the quantum-confined Stark effect. For example, the Wannier-Stark effect may be used.

I claim:

1. An optical switch comprising:
    a voltage pull-down device;
    a voltage controlled optical modulator, said modulator performing voltage pull-up, said pull-down device and said modulator being connected in series;
    signal means for enabling and disabling said pull-down device;
    optical clock means for illuminating said voltage controlled optical modulator, said optical clock means triggering said voltage pull-up, the optical output from said voltage controlled optical modulator indicating the state of said switch;
    and sensor means for receiving said optical output.

2. An optical switch as recited in claim 1 in which states of said switch are defined by charge storage.

3. An optical switch as recited in claim 1 in which said voltage controlled optical modulator comprises a SEED diode.

4. An optical switch as recited in claim 3 in which said optical means comprises a laser.

5. An optical switch as recited in claim 4 in which said laser comprises a mode-locked laser.

6. An optical switch as recited in claim 1 in which said pull down device comprises a SEED diode.

7. An optical switch as recited in claim 6 in which said optical output from said SEED diode modulator comprises said signal means for another switch.

8. An optical switch as recited in claim 1 in which said signal means comprises optical means for illuminating said pull-down device.

9. An optical switch as recited in claim 1 in which said pull-down device comprises a field-effect transistor.

10. An optical switch as recited in claim 9 in which said transistor is normally off.

11. An optical switch as recited in claim 9 in which said signal means comprises an electrical signal applied to the gate of said transistor.

12. An optical switch as recited in claim 11 further comprising a series connected photodiode and a load, the common node of said photodiode and load being connected to the gate of said field-effect transistor, said signal means illuminating said photodiode.

13. An optical logic gate comprising an optical switch as recited in claim 1, said signal means comprises means for producing two orthogonally polarized beams.

14. A switch as recited in claim 1 in which said signal means and said optical clock means are pulsed and interleaved in time.

15. A switch as recited in claim 1 in which at least one component exhibits a thresholding behavior.

16. A method for operating an optical switch comprising:
   illuminating at least one of first and second SEED diodes connected in series, each of said SEED diodes having a p-i-n structure, said i-type region comprising a multiple quantum well region; and
   said illuminating being at staggered times and with a wavelength longer than the exciton wavelength and with pulses shorter than the diode sweep out time.

17. An optical switch comprising:
   an input section and an output section, said input section comprising a series connected photodiode and a load;
   said output section comprising a voltage controlled optical modulator and a series-connected field-effect transistor, said transistor having its gate connected to the common node of said input section, said modulator being connected to the drain electrode of said transistor;
   clock means for illuminating said modulator, said modulator having an optical output, said optical output from said modulator indicating the state of said switch;
   signal means for illuminating said photodiode; and
   sensor means for receiving the optical output from said modulator.

18. A switch as recited in claim 17 in which said modulator comprises a

19. A switch as recited in claim 18 in which states of said switch are defined by charge storage as the output stage common node.

20. A switch as recited in claim 18 in which states of said switch are defined by charge storage at the input stage common node.

21. A switch as recited in claim 18 in which the common node of the input stage is connected to the gate of the transistor in the output stage through an electronic amplification stage.

22. An optoelectronic processing module comprising at least one optical switch as recited in claim 18, each of said at least one optical switches further comprising electronic processing means connected to said input and said output sections.

23. A plurality of optoelectronic processing modules as recited in claim 22, said modules forming an array.

24. An optical switch comprising:
   means for receiving an optical input signal pulse, the total energy in said pulse determining the signal level, said means generating stored charge in response to said pulse, the state of said switch being determined by said stored charge and a nonlinear optical property; and
   means for modulating a probe pulse, said means being connected to said means for receiving, said probe pulse discharging said stored charge thereby resetting said switch.

25. An optical switch as recited in claim 24 in which said probe pulse has an energy greater than the energy of said signal pulse.

* * * * *